United States Patent
Nakagawa et al.

(10) Patent No.: US 8,994,233 B2
(45) Date of Patent: Mar. 31, 2015

(54) MOVABLE IRON CORE LINEAR ACTUATOR

(75) Inventors: Hiroshi Nakagawa, Ise (JP); Takayoshi Fujii, Ise (JP); Takashi Fukunaga, Ise (JP)

(73) Assignee: Sinfonia Technology Co., Ltd., Tokyo (JP)

( * ) Notice: Subject to any disclaimer, the term of this patent is extended or adjusted under 35 U.S.C. 154(b) by 309 days.

(21) Appl. No.: 13/809,359

(22) PCT Filed: Jul. 11, 2011

(86) PCT No.: PCT/JP2011/065809
§ 371 (c)(1),
(2), (4) Date: Jan. 9, 2013

(87) PCT Pub. No.: WO2012/008417
PCT Pub. Date: Jan. 19, 2012

(65) Prior Publication Data
US 2013/0106203 A1    May 2, 2013

(30) Foreign Application Priority Data
Jul. 12, 2010   (JP) ................................ 2010-157506

(51) Int. Cl.
*H02K 41/02*   (2006.01)
*H02K 33/16*   (2006.01)
*H02K 41/035*  (2006.01)

(52) U.S. Cl.
CPC .............. *H02K 41/035* (2013.01); *H02K 33/16* (2013.01)
USPC .................................... 310/12.26; 310/12.24

(58) Field of Classification Search
CPC ................................. H02K 33/16; H02K 1/34
USPC ....................................... 310/12.24, 12.26, 25
See application file for complete search history.

(56) References Cited

U.S. PATENT DOCUMENTS

| | | | |
|---|---|---|---|
| 5,896,076 A * | 4/1999 | van Namen | 335/229 |
| 2006/0145545 A1* | 7/2006 | Reichert et al. | 310/14 |
| 2008/0129125 A1* | 6/2008 | Pagani | 310/12 |
| 2010/0127442 A1 | 5/2010 | Muragishi et al. | |
| 2010/0127580 A1* | 5/2010 | Schrader | 310/12.26 |

FOREIGN PATENT DOCUMENTS

| | | |
|---|---|---|
| JP | 2002-78252 A | 3/2002 |
| JP | 2006-14464 A | 1/2006 |
| JP | 2008-256110 A | 10/2008 |

OTHER PUBLICATIONS

International Search Report for PCT/JP2011/065809, mailing date of Sep. 27, 2011.

* cited by examiner

*Primary Examiner* — Hanh Nguyen
(74) *Attorney, Agent, or Firm* — Westerman, Hattori, Daniels & Adrian, LLP

(57) ABSTRACT

There is provided a movable iron core linear actuator, which includes a magnetic circuit (mc) which causes a moving element (2) to reciprocate. The magnetic circuit (mc) includes an iron core (20) constituting the moving element (2), a stator core (10) including a facing portion (10*c*) which faces the iron core (20), a pair of permanent magnets (12*a*, 12*b*) disposed in the facing portion (10*c*) along a reciprocating direction and having inverted magnetic poles at their surfaces which face the iron core, and a coil (11) wound around the stator core (10). Energization to coil (11) causes the moving element (2) to reciprocate. When the coil (11) is not energized, offset force (F4) is applied to the moving element (2) by the magnetic flux produced by the permanent magnets (12*a*, 12*b*).

16 Claims, 10 Drawing Sheets

Fig. 3
(a) NOT ENERGIZED
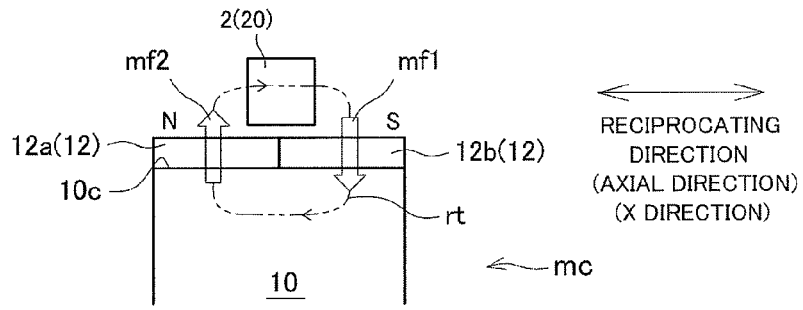
(b) ENERGIZED IN POSITIVE DIRECTION
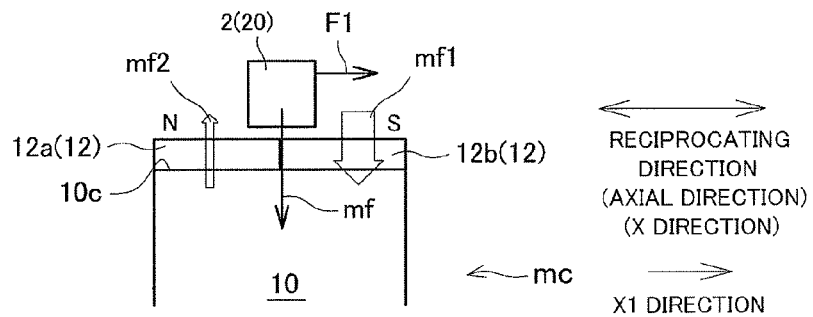
(c) ENERGIZED IN REVERSE DIRECTION
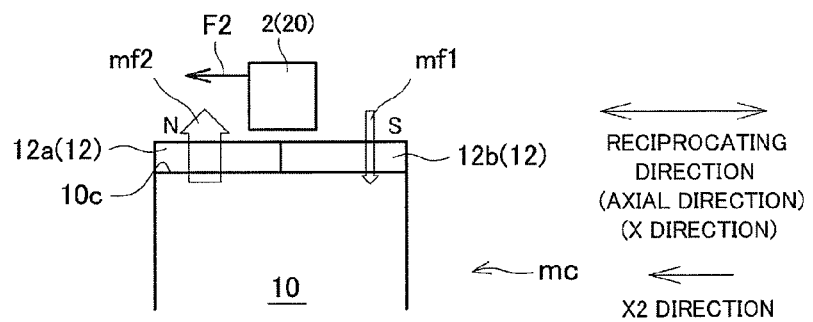

Fig. 4
(a) IF MAGNETIC FLUX DENSITY IS EQUAL AT BOTH SIDES IN RECIPROCATING DIRECTION
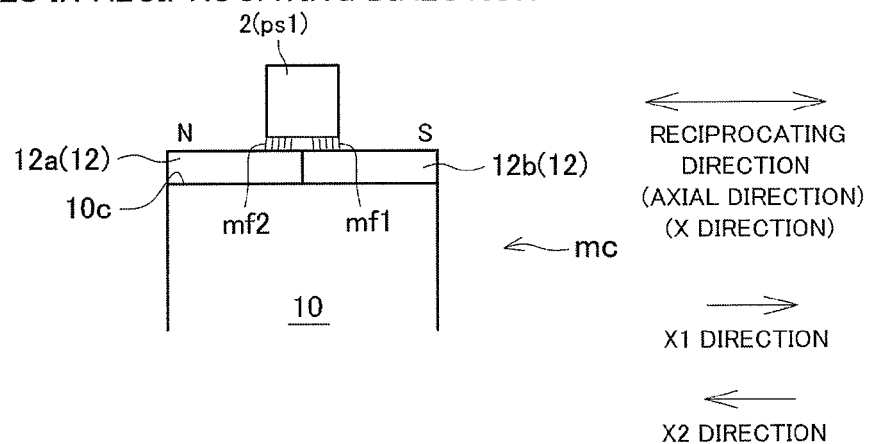
(b) IF MOVING ELEMENT IS DISPLACED TO X2 DIRECTION
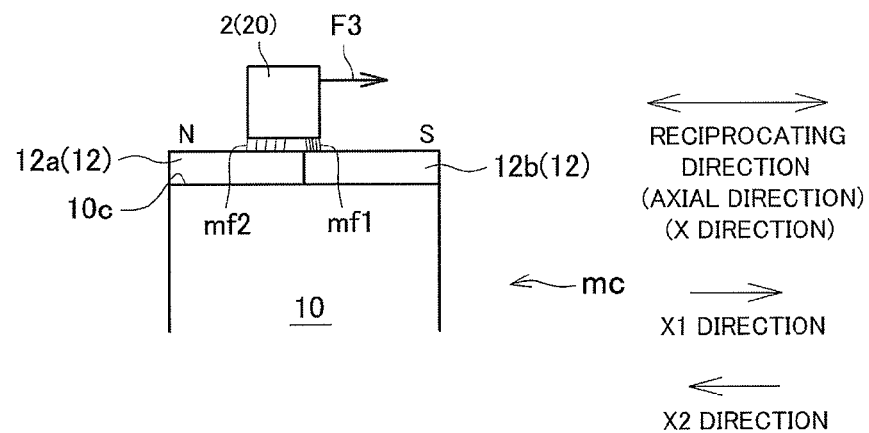

Fig. 6
(a) SPACE PORTION IS NOT FORMED
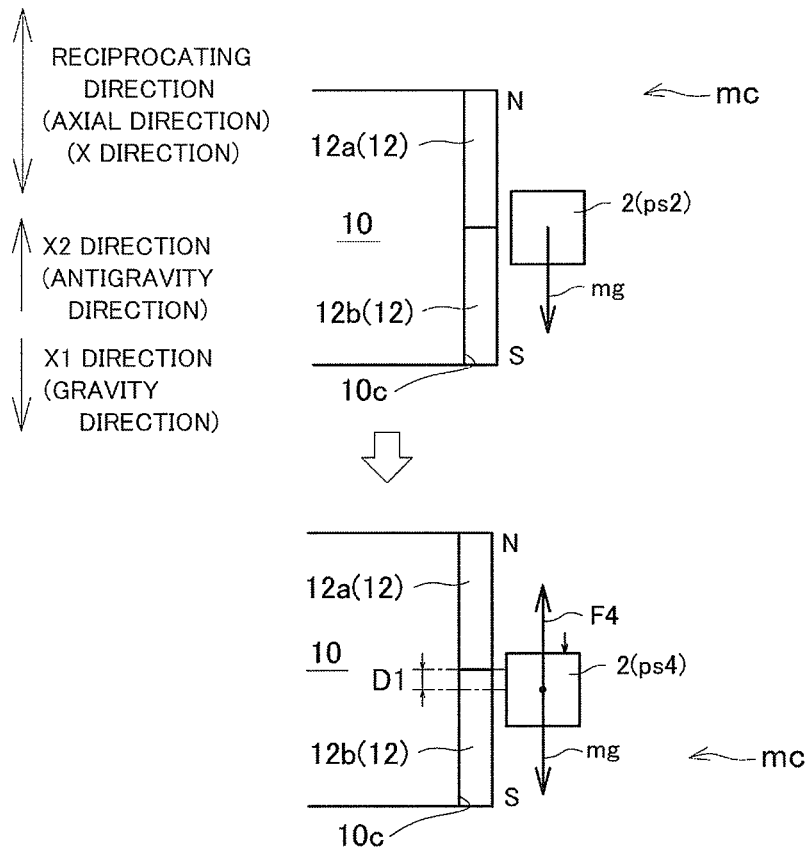
(b) SPACE PORTION IS FORMED
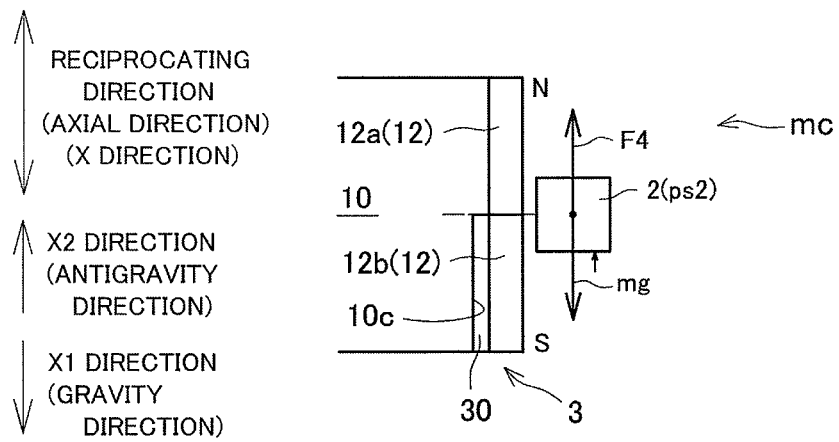

MOVABLE IRON CORE LINEAR ACTUATOR

TECHNICAL FIELD

The present invention relates to a movable iron core linear actuator in which a moving element reciprocates. More particularly, the present invention relates to a movable iron core linear actuator in which an offset position of a moving element is properly adjusted if the offset position of the moving element is displaced due to gravity acting thereon.

BACKGROUND ART

A movable iron core linear actuators, such as a reciprocal motor, includes, as a main component, a magnetic circuit in which a moving element reciprocates when being energized as illustrated in, for example, Patent Document 1. The magnetic circuit includes an iron core constituting a moving element, a stator core including a facing portion which faces the iron core, a pair of permanent magnets disposed in a facing portion along the reciprocating direction and having inverted magnetic poles at their surfaces which face the iron core, and a coil wound around the stator core. A magnetic flux produced by energization of coil weakens a magnetic flux produced in a magnet situated in a necessary direction between the pair of permanent magnets, and strengthens a magnetic flux produced in the other magnet. Therefore, the moving element is made to reciprocate with respect to the stator core.

The magnetic circuit causes self holding force to act on the moving element by the magnetic flux produced by the permanent magnets in a state in which the coil is not energized. The self holding force is not external force which acts on the moving element by a mechanical element, such as a flat spring, but self force produced in the moving element by the magnetic flux of the permanent magnets. The self holding force acts on the moving element so as to return the moving element to a predetermined position if the moving element has been displaced from the predetermined position. This self holding force is also called offset force produced by the magnetic flux of the permanent magnets.

If, however, the position of a linear actuator in which offset force by the permanent magnets is set so as to return the moving element to the center of the movable range of the moving element in a state in which the linear actuator is at a horizontal position is changed to a longitudinal position, the offset force by the permanent magnets becomes smaller than the gravity which acts on the moving element at the center of the movable range and the moving element is displaced downward from the center of the movable range. In this case, there is a problem that, in order to avoid collision with, for example, an unillustrated casing which houses the moving element and the stator, a reciprocatable range of the moving element becomes narrower than original movable range, and therefore it is not possible to cause the moving element to reciprocate with an amplitude that requires a range wider than the range in which reciprocation is possible.

As a means to solve this problem, Patent Documents 1 and 2 disclose a device which adjusts the offset position, which is a balanced point of the gravity acting on a moving element and the offset force by the permanent magnets, is situated at the center of the movable range. In the device, positions of the permanent magnets are determined or strength of each permanent magnet is made to vary such that the magnetic flux of the permanent magnets is biased when not energized, and therefore the offset force by the permanent magnets is increased upward.

PRIOR ART DOCUMENT

Patent Document

Patent Document 1: Japanese Patent Application Laid-open No. 2008-256110
Patent Document 2: Japanese Patent Application Laid-open No. 2006-14464

SUMMARY OF THE INVENTION

Problems to be Solved by the Invention

However, in such configurations as the Patent Document 1 and 2 in which the thickness and material of the pair of permanent magnets are changed in order to cause the magnetic fluxes produced in the permanent magnets to be unbalanced, since a plurality of kinds of permanent magnets are used and thereby the number of components is increased or since the cost of the permanent magnets increases, the manufacturing cost increases. Further, since the thickness and material of the permanent magnet are limited, fine adjustment of the offset position is difficult.

It is also possible to provide another mechanism, such as a flat spring, for the adjustment of the offset position. In such a case, however, an increased number of parts may raise the manufacturing cost and increase the size of the entire actuator.

The present invention has been made in view of these problems, and an object thereof is to provide a movable iron core linear actuator configured to properly adjust an offset position without any increase in manufacturing cost or device size.

Means for Solving the Problem

The following measure has been devised as the present invention in order to solve the above-described problems.

That is, a movable iron core linear actuator of the present invention is a linear actuator of which moving element is made to reciprocate, the linear actuator including a magnetic circuit which includes: an iron core which constitutes the moving element; a stator core which includes a facing portion which faces the iron core; a pair of permanent magnets disposed in a facing portion along the reciprocating direction, the pair of permanent magnets having inverted magnetic poles at their surfaces which face the iron core; and a coil wound around the stator core, the magnetic circuit causing, via the magnetic flux produced by energization of the coil, the moving element to reciprocate by weakening the magnetic flux produced in the magnet situated in a necessary direction between the pair of permanent magnets, and strengthening the magnetic flux produced in the other magnet, and the magnetic circuit causing the offset force to act on the moving element by the magnetic flux produced by the permanent magnet in a state in which the coil is not energized, wherein since a space portion having low magnetic permeability compared with the stator core is provided in a state in which a part of the facing portion is removed in an area, which is a magnetic flux path, between a part of the facing portion of the stator core and the permanent magnet, an offset position which is a balanced point of the gravity acting on the moving element and the offset force by the permanent magnets is changed compared with a case in which no space portion is provided.

As described above, the offset position which is the balanced point of the gravity acting on the moving element and the offset force by the permanent magnets may be adjusted to a desired position by only forming the space portion in a state in which a facing portion of the stator core has a cut-out. Therefore, it is possible to properly adjust the offset position without any increase in manufacturing cost or device size compared with a case in which a plurality of kinds of permanent magnets are used or other mechanisms are introduced. Further, since it is only a process of forming the space portion in a state in which the facing portion of the stator core has a cut-out, it is possible to pursue reduction in manufacturing cost without the need of adding additional components or largely changing manufacturing steps.

In order to make the amplitude of the reciprocation operation of the moving element be maximum, it is desirable that the space portion is formed such that the offset position is situated at the center of the movable range of the moving element.

In order to change the offset position which is the balanced point of the gravity acting on the moving element and the offset force by the permanent magnets toward the antigravity direction, it is desirable that the space portion is formed only in the facing portion which faces the permanent magnet on the side of gravity direction between the pair of permanent magnets.

In order to improve attachment strength of the permanent magnets while reducing an influence on the moving element, it is effective that the permanent magnet in which the space portion is formed between the permanent magnet and the facing portion of the stator core is supported by a pillar portion which is formed at the facing portion outside the movable range of the moving element.

In order to make adjustment of the offset position be possible even in a configuration in which a plurality of permanent magnets are provided in pairs to increase electromagnetic driving force to cause the moving element to reciprocate through energization, it is considered that a plurality permanent magnets are provided in pairs and the space portion is formed between one of the permanent magnets of each of the pairs and the facing portion which faces that permanent magnet.

Effect of the Invention

In the present invention, as described above, the offset position which is the balanced point of the gravity acting on the moving element and the offset force by the permanent magnets may be adjusted to a desired position by only forming the space portion in a state in which a facing portion of the stator core has a cut-out. Therefore, it is possible to properly adjust the offset position without any increase in manufacturing cost or device size compared with a case in which a plurality of kinds of permanent magnets are used or other mechanisms are introduced. Further, since it is only a process of forming the space portion in a state in which the facing portion of the stator core has a cut-out, it is possible to pursue reduction in manufacturing cost without the need of adding additional components or largely changing manufacturing steps. Accordingly, it is possible to provide a movable iron core linear actuator suitable for reducing the cost and the device size.

BRIEF DESCRIPTION OF THE DRAWINGS

FIG. 3 illustrates explanatory views related to a reciprocating operation of a moving element by energization of a coil.

FIG. 4 illustrates explanatory views related to offset force produced by a magnetic flux of a permanent magnet.

FIG. 6 illustrates explanatory views illustrating, in comparison, an offset position in a case in which a space portion is formed and a case in which the space portion is not formed.

MODE FOR CARRYING OUT THE INVENTION

Hereinafter, an embodiment of the present invention will be described with reference to the drawings.

Figure 1:
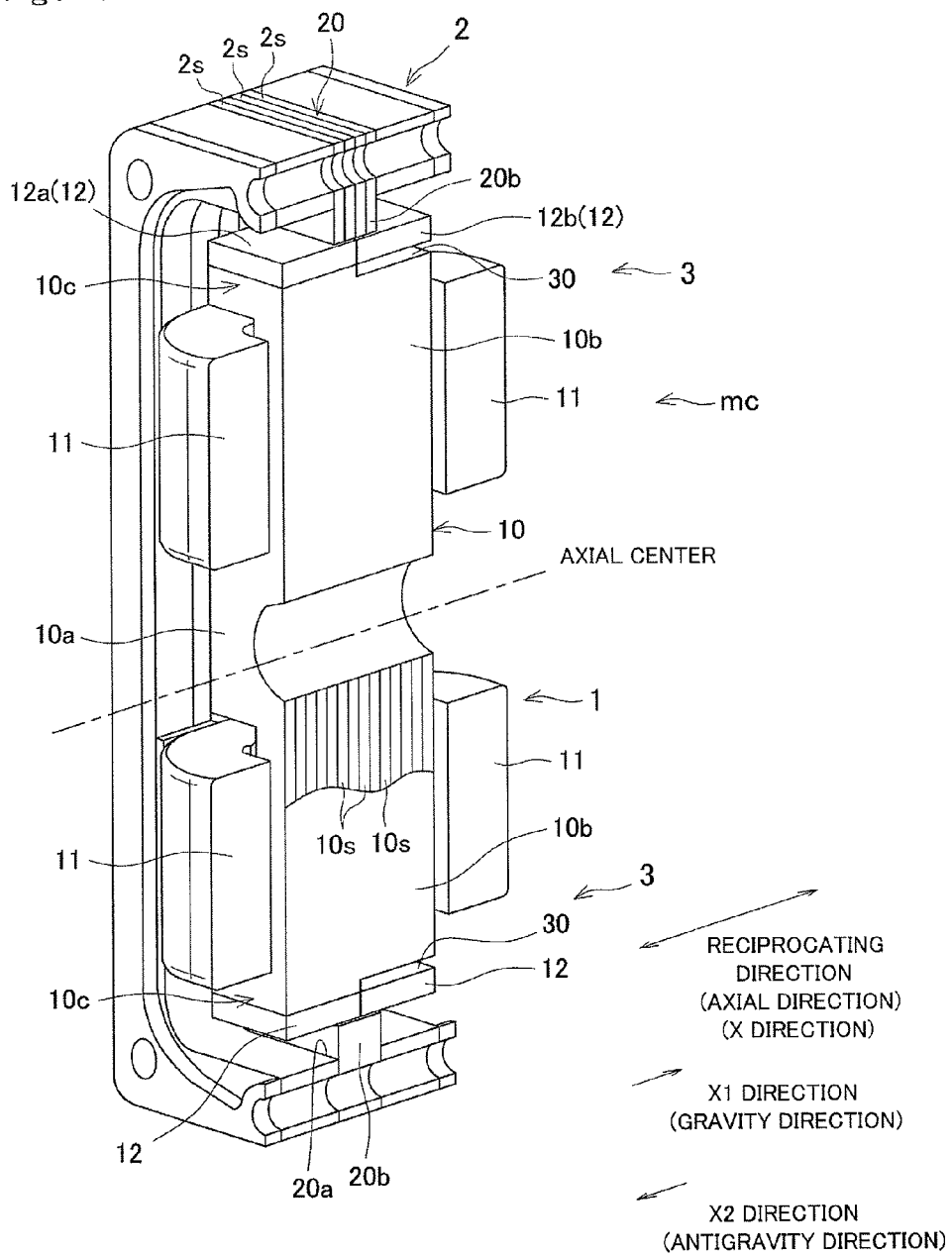
FIG. 1 is a partially fragmentary perspective view of a movable iron core linear actuator according to an embodiment of the present invention.
Figure 2:
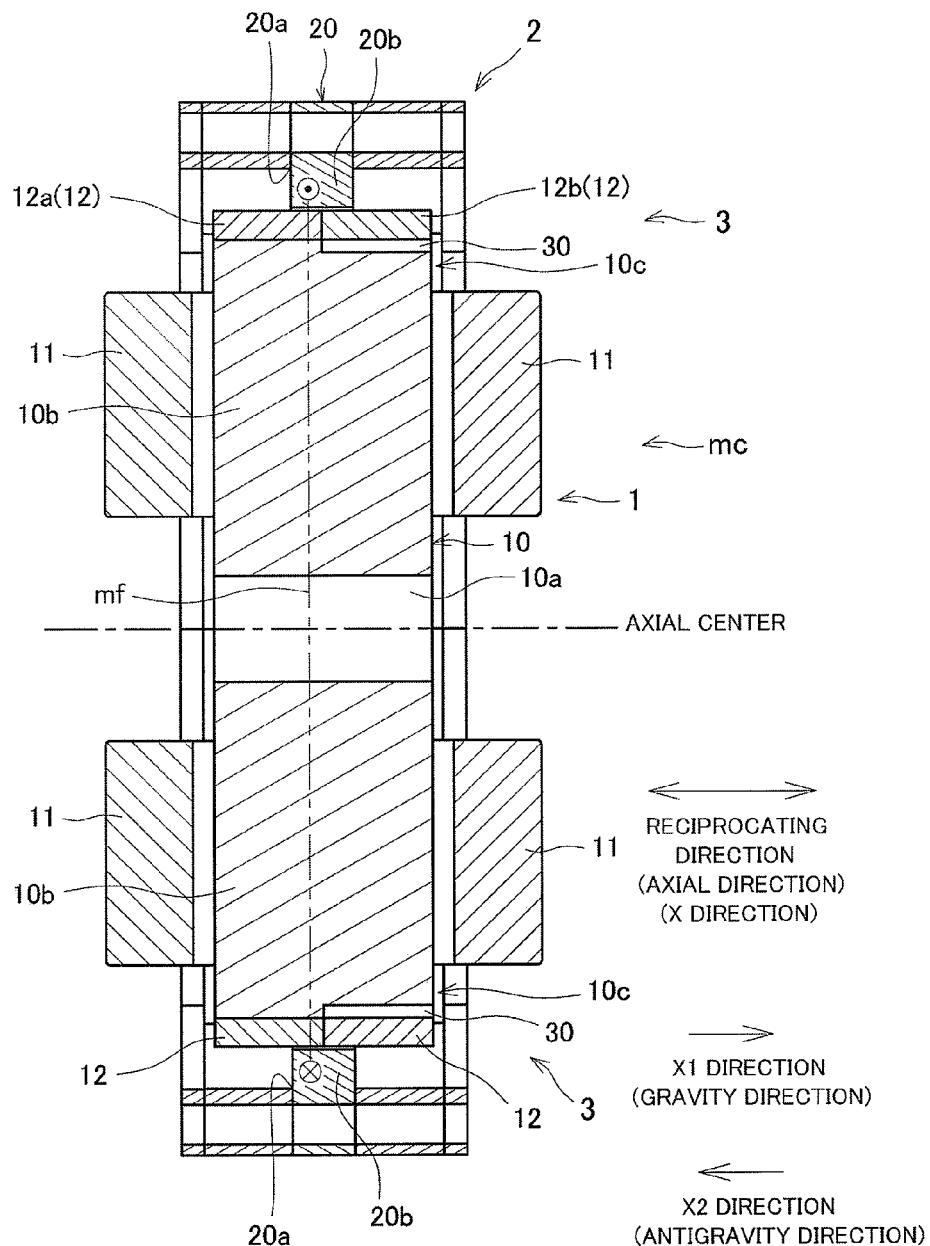
FIG. 2 is a longitudinal cross-sectional view of the linear actuator.

As illustrated in FIGS. 1 and 2, which are longitudinal cross-sectional view along an axial center, the movable iron core linear actuator of the present embodiment is an outer rotor type linear actuator in which a moving element 2 is disposed in a radial direction outside of a stator 1. The linear actuator includes the moving element 2 formed in a substantially cylindrical shape and movable in the axial direction (i.e., the X direction), the stator 1 disposed inside the moving element 2, and a magnetic circuit mc causing the moving element 2 to reciprocate along the axial direction (i.e., a reciprocating direction).

Note that the radial direction outside is the direction further away from the axial center, and the radial direction inside is the direction to approach to the axial center, and that the shape of the moving element 2 or the stator 1 is not limited to a column or a cylinder as illustrated in the drawings.

As illustrated in partial detail in FIG. 1, the moving element 2 includes, as a main component, an iron core 20 which is constituted by a plurality of moving element core boards 2s which are stacked and fixed into a substantially cylindrical shape. A pair of pole portions 20b and 20b are formed to protrude in the radial direction inside from an inner wall 20a of the iron core 20. The moving element 2 is supported by a not illustrated mechanical spring portion, such as a flat spring, at both ends in the axial direction. Thus, the moving element 2 can reciprocate in the axial direction.

The stator 1 includes a stator core 10 in which a pair of salient pole portions 10b and 10b are formed to protrude in the radial direction outside from an axial central portion 10a, a coil 11 wound around the salient pole portions 10b and 10b of the stator core 10, and a pair of permanent magnets 12 (12a, 12b) disposed along the axial direction (i.e., the reciprocating direction) in a facing portion 10c (i.e., a facing surface) of the salient pole portion 10b at portions which face the pole portions 20b of the iron core 20, the pair of permanent magnets 12 having inverted magnetic poles at their surfaces which face the iron core 20. As illustrated in partial detail in FIG. 1, the stator core 10 is constituted by a plurality of stator core boards 10s which are stacked and fixed in the same manner as the iron core 20 which constitutes the moving element 2 described above.

The magnetic circuit mc includes the iron core 20, the stator core 10, the pair of permanent magnets 12 (12a, 12b) and the coil 11. When the coil 11 is energized, the moving element 2 is made to reciprocate. In the present embodiment, the movable iron core actuator is constituted with the components which constitute the moving element 2 among a plurality of components which constitute the magnetic circuit mc being used as the iron core 20. In particular, when the coil 11 is not energized, as illustrated in FIG. 3(a), the pair of permanent magnets 12a and 12b forms a loop-shaped magnetic flux path rt which starts at one permanent magnet 12a, passes through the iron core 20, the other permanent magnet 12b and the stator core 10 and returns to one permanent magnet 12a. Thus, magnetic fluxes mf1 and mf2 which are opposite in direction are produced at both sides of the moving elements 2 in the reciprocating direction. In this case, when the coil 11 is energized in the positive direction, the magnetic flux mf is produced by the energization of the coil 11 as illustrated in FIGS. 2 and 3(b), among the two magnetic fluxes mf1 and mf2 produced by the permanent magnets 12, the magnetic flux mf1 which is in the same direction of the magnetic flux mf produced by the energization of the coil 11 becomes stronger and the other one, i.e., the magnetic flux mf2 becomes weaker. Then, electromagnetic driving force F1 is applied to the moving element 2 (i.e., the iron core 20) and the moving element 2 is moved in the direction in which the magnetic flux becomes stronger ("X1 direction"). If the coil 11 is energized in the reverse direction, as illustrated in FIG. 3(c), electromagnetic driving force F2 is applied to the reverse direction ("X2 direction") and the moving element 2 is moved in the X2 direction. That is, in the magnetic circuit mc, the magnetic flux mf produced by energization of the coil 11 weakens the magnetic flux mf2 (mf1) produced in the magnet 12a (12b) situated in a necessary direction between the pair of permanent magnets 12a and 12b, and strengthens the magnetic flux mf1 (mf2) produced in the other magnet 12b (12a). Therefore, the electromagnetic driving force F1 (F2) is applied to the moving element 2 so that the moving element 2 is made to reciprocate.

Figure 5:
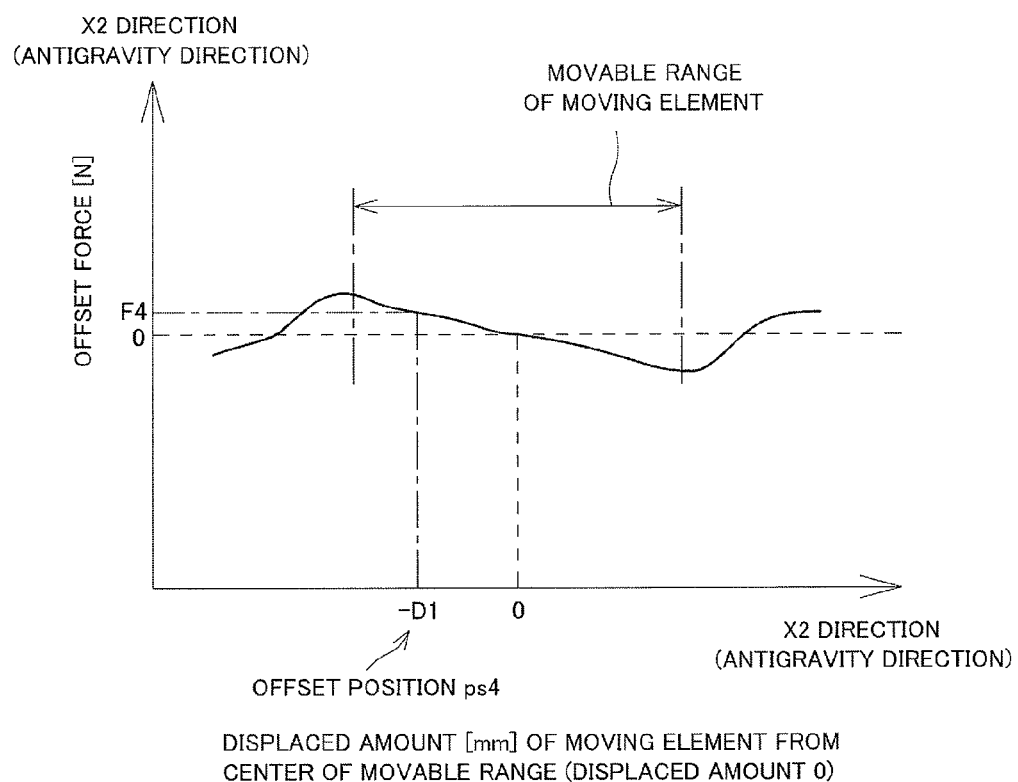
FIG. 5 is an explanatory view related to offset force which is applied to the moving element.

The magnetic circuit mc causes the offset force to be applied to the moving element 2 by the magnetic flux produced by the permanent magnet 12. The offset force is the force for return the moving element 2 to the predetermined position if the moving element 2 is displaced from the predetermined position. That is, when the moving element 2 is at a position ps1 at which the magnetic flux density of the moving element 2 is equal at both sides in the reciprocating direction as schematically illustrated by the intervals of lines in FIG. 4(a), the magnetic flux path on the side of the X2 direction becomes large while the magnetic flux path on the side of the X1 direction becomes narrow as, for example, the moving element 2 is displaced in the X2 direction as illustrated in FIG. 4(b). Therefore, the magnetic flux density on the side of the X2 direction becomes weaker while the magnetic flux density on the side of the X1 direction becomes stronger. In this case, offset force F3 acts to move the moving element 2 in the X1 direction so that the moving element 2 returns to the position ps1 at which the magnetic flux density of the moving element 2 at both sides in the reciprocating direction is equal. The offset force in the present embodiment is set to become large as the moving element 2 is distanced from the center of the movable range of the moving element 2 (displaced amount: 0) as illustrated in FIG. 5, and is determined depending on, for example, the magnetic flux density, magnetic flux distribution, and pole pitch between the iron core and the permanent magnets. Note that the offset force may be set to a constant value irrespective of displacement of the moving element.

However, in a case in which the offset force by the permanent magnets 12 has been set such that the moving element 2 returns to the center of the movable range of the moving element 2 when the linear actuator is in its horizontal position in which the reciprocating direction corresponds to the horizontal direction as illustrated in FIG. 5, if the position of the linear actuator is changed into the longitudinal direction in which the reciprocating direction thereof crosses the horizontal direction as illustrated in FIG. 6(a) and FIG. 5, the offset force (thrust 0) at the center ps2 of the movable range of the moving element (displaced amount 0) becomes smaller than the gravity mg which acts on the moving element 2, and the moving element 2 is displaced downward from the center ps2 of the movable range of the moving element 2 by the distance D1, and the moving element 2 is displaced downward to reach the offset position ps4 which is the balanced point of the gravity mg and the offset force F4. In this case, there is a problem that, in order to avoid collision with, for example, an unillustrated casing which houses the moving element and the stator, a reciprocatable range of the moving element 2 becomes narrower than an original movable range and, therefore, it is not possible to cause the moving element 2 to reciprocate with an amplitude that requires a range wider than the range in which reciprocation is possible.

Then, in the present embodiment, as illustrated in FIGS. 1 and 2, magnetic flux distribution is changed by forming a space portion 30 having low magnetic permeability compared with the stator core 10. The space portion 30 is formed in a state in which a part of the facing portion 10c is removed in an area, which is a magnetic flux path, between a part of the facing portion 10c of the stator core 10 and the permanent magnet 12. The space portion 30 is formed only in the facing portion 10c which faces the permanent magnet 12b on the side of the gravity direction between the pair of permanent magnets 12a and 12b. The depth of the space portion 30 between the permanent magnet 12b and the facing portion 10c is set to be constant across the axial direction so that there is no point of contact between the permanent magnet 12b and the facing portion 10c on the side of the gravity direction.

Figure 7:
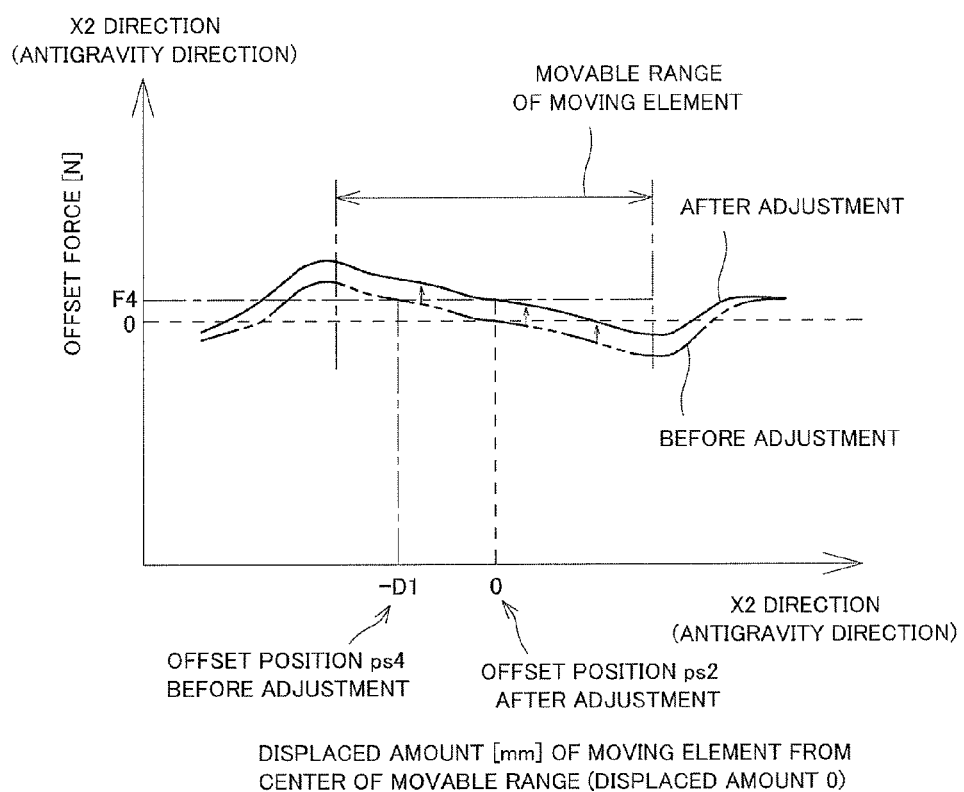
FIG. 7 is an explanatory view illustrating, in comparison, offset force in a case in which the space portion is formed and a case in which the space portion is not formed.

If such a space portion 30 is formed, the magnetic flux on the side of the gravity direction is weakened by the space portion 30 while the magnetic flux in the antigravity direction is strengthened and, as illustrated in FIG. 7, the offset force by the magnetic flux of the permanent magnets 12 is strengthened toward the antigravity direction in which the magnetic flux is strong. As illustrated in FIGS. 6 and 7, if there is no space portion 30, the offset position which is the balanced point of the gravity mg acting on the moving element 2 and the offset force F4 by the permanent magnets 12 becomes the position ps4 that is displaced downward from the center ps2 of the movable range of the moving element 2 by the distance D1. However, by forming the space portion 30, the offset position is changed to the center ps2 of the movable range of the moving element 2.

As described above, the space portion 30 is formed to constitute an offset adjustment portion 3 which changes the magnetic flux distribution and, by the offset adjustment portion 3, the offset position which is the balanced point of the gravity mg acting on the moving element 2 and the offset force F4 by the permanent magnets 12 is varied (i.e., changed) to a position ps2 from a position ps4 that is the offset position in a case in which no space portion 30 is provided (see FIG. 6). The offset force can be adjusted by various changes in, for example, the dimension of the space portion 30 in the axial direction and in a direction which perpendicularly intersects the axial direction, the shape such as depth, the position to arrange, and the number to form. For example, it is considered that a bottom surface of the space portion 30 is inclined with respect to the axial center, or the dimension and the depth of the space portion 30 are changed along the axial center.

As described above, the movable iron core linear actuator of the present embodiment is a linear actuator of which moving element 2 is made to reciprocate. The linear actuator includes the magnetic circuit mc which includes the iron core 20 constituting the moving element 2, the stator core 10 including a facing portion 10c which faces the iron core 20, the pair of permanent magnets 12 (12a, 12b) disposed in the facing portion 10c along the reciprocating direction and having inverted magnetic poles at their surfaces which face the iron core, and the coil 11 wound around the stator core 10. The magnetic circuit mc causes, via the magnetic flux mf produced by energization of the coil 11, the moving element 2 to reciprocate by weakening the magnetic flux mf2 (mf1) produced in the magnet 12a (12b) situated in a necessary direction between the pair of permanent magnets 12a and 12b, and strengthening the magnetic flux mf1 (mf2) produced in the other magnet 12b (12a). The magnetic circuit mc causes the offset force F4 to act on the moving element by the magnetic flux produced by the permanent magnets 12 in a state in which the coil 11 is not energized. The space portion 30 having low magnetic permeability compared with the stator core 10 is provided in a state in which a part of the facing portion 10c is removed in an area, which is a magnetic flux path, between a part of the facing portion 10c of the stator core 10 and the permanent magnet 12. Thus, an offset position which is a balanced point of the gravity mg acting on the moving element 2 and the offset force F4 by the permanent magnets 12 is changed compared with a case in which no space portion 30 is provided.

As described above, by only forming the space portion 30 in a state in which the facing portion 10c of the stator core 10 is removed, the offset position which is the balanced point of the gravity mg acting on the moving element 2 and the offset force F4 by the permanent magnets 12 may be adjusted to a desired position. Therefore, it is possible to properly adjust the offset position without any increase in manufacturing cost or device size compared with a case in which a plurality of kinds of permanent magnets are used or other mechanisms are introduced. Further, since it is only a process of forming the space portion in a state in which the facing portion of the stator core has a cut-out, it is possible to pursue reduction in manufacturing cost without the need of adding additional components or largely changing manufacturing steps.

Especially in the present embodiment, since the space portion 30 is formed such that the offset position is at the center ps2 of the movable range of the moving element 2, the amplitude of the reciprocation operation of the moving element 2 can be made the maximum and therefore the movable range of the moving element 2 can be used effectively.

In the present embodiment, since the space portion 30 is formed only in the facing portion 10c which faces the permanent magnet 12b on the side of gravity direction between the pair of permanent magnets 12a and 12b, the magnetic flux on the side of the gravity direction is weakened by the space portion 30 while the magnetic flux in the antigravity direction is strengthened. Therefore, since the offset force by the magnetic flux of the permanent magnets 12 becomes large toward the antigravity direction in which the magnetic flux is strong, offset position which is the balanced point of the gravity mg acting on the moving element 2 and the offset force F4 by the permanent magnet 12 can be changed toward the side of the antigravity direction.

Although an embodiment of the present invention has been described, specific configuration of each component is not limited to that of the foregoing embodiment.

Figure 8:
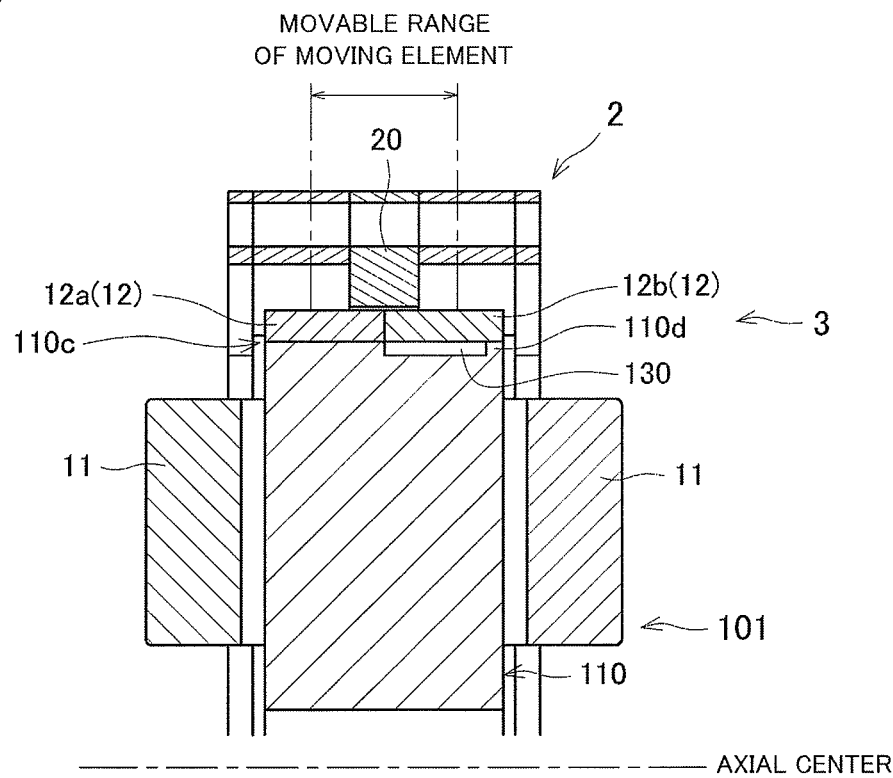
FIG. 8 is a longitudinal cross-sectional view illustrating a linear actuator related to another embodiment of the present invention.

For example, as illustrated in FIG. 8, it is considered that a pillar portion 110d is formed at an end in the axial direction of a facing portion 110c of a stator core 110 which constitutes a stator 101, and a permanent magnet 12b in which the space portion 130 is formed between the facing portion 110c of the stator core 110 and a permanent magnet 12b is supported by the pillar portion 110d outside the movable range of the moving element 2. With this configuration, although the attachment strength of the permanent magnet 12b in which the space portion 130 is formed between the facing portion 110c of the stator core 110 and a permanent magnet 12b with respect to the stator core 110 is low, since the permanent magnet 12b is supported by the pillar portion 110d formed in the facing portion 110c outside the movable range of the moving element 2, it is possible to improve the attachment strength of the permanent magnet 12b while reducing the influence on the moving element 2.

Figure 9:
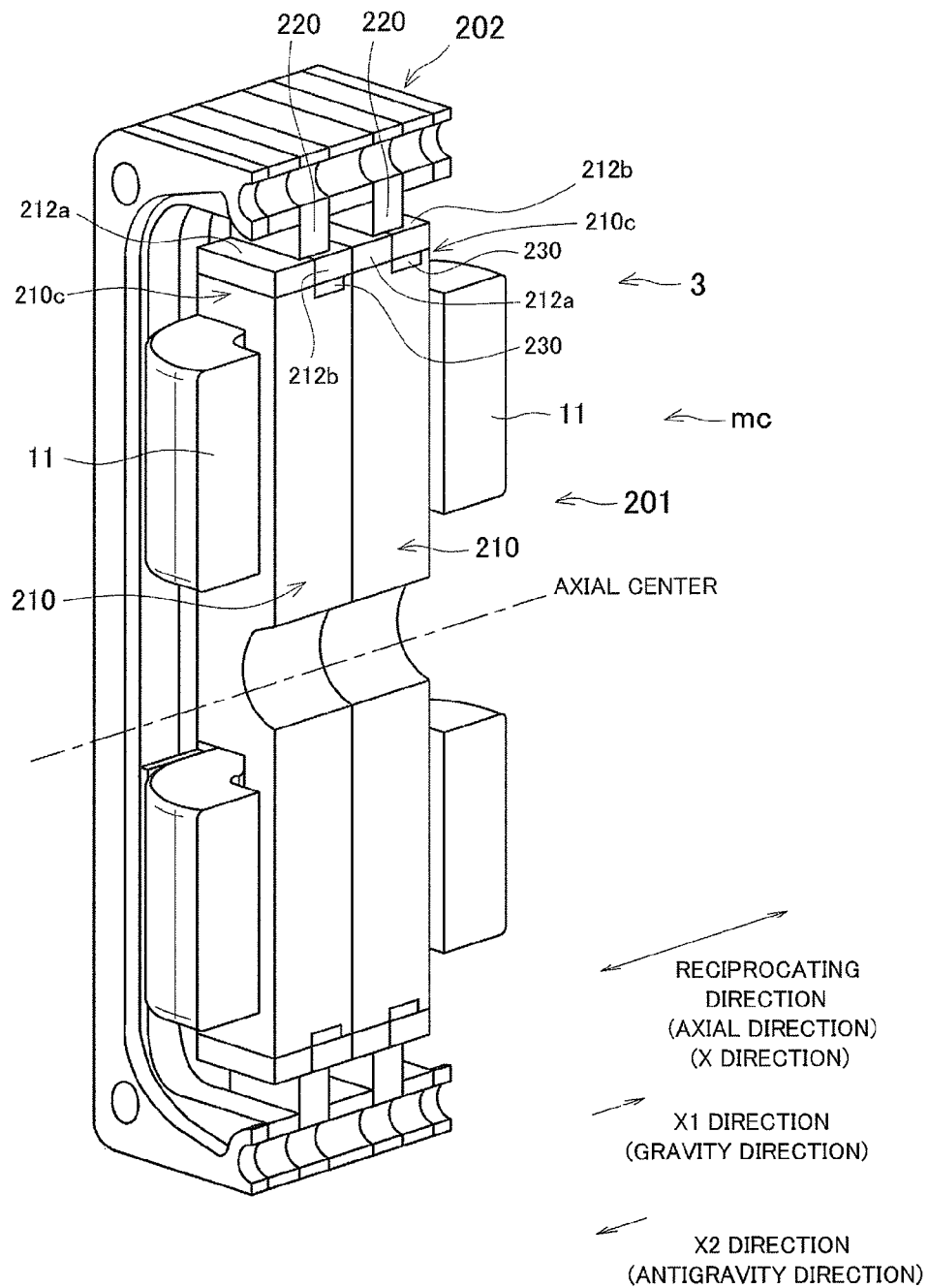
FIG. 9 is a partially fragmentary perspective view of a linear actuator related to an embodiment other than the foregoing embodiments of the present invention.
Figure 10:
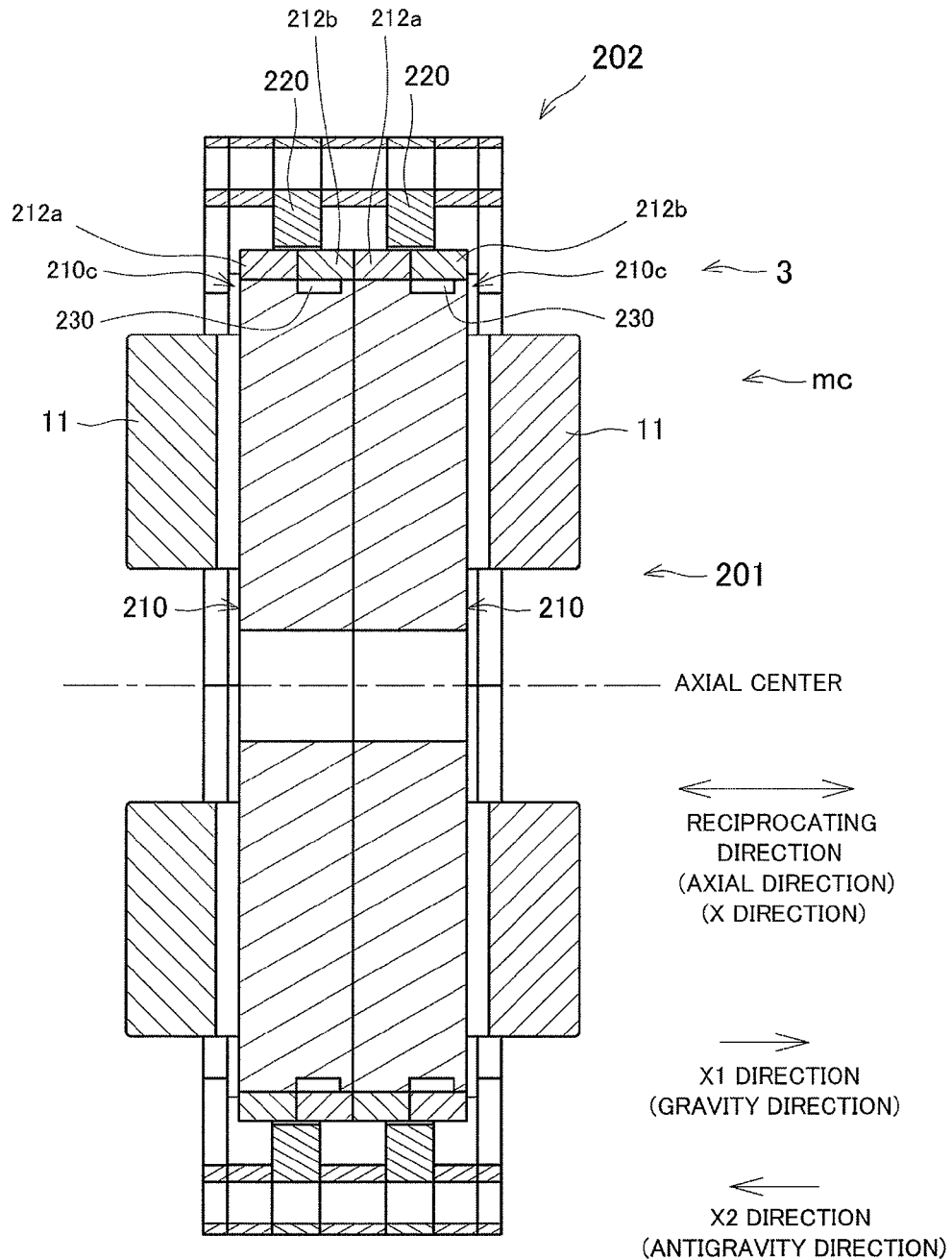
FIG. 10 is a longitudinal cross-sectional view illustrating the linear actuator corresponding to FIG. 9.

Further, as illustrated in FIGS. 9 and 10, an iron core 220 which constitutes a moving element 202, a facing portion 210c of a stator core 210 and a pair of permanent magnets 212a and 212b may be formed as a single unit. It is considered that a plurality of such units are provided along the axial direction so that the permanent magnets 212a and 212b are provided in pairs, and a space portion 230 is formed between one permanent magnet 212b of the pair of permanent magnets 212a and 212b which constitute each unit and a facing portion 210c which faces this permanent magnet 212b. With such a configuration, the offset position may be adjusted even in a configuration in which a plurality of permanent magnets 212a and 212b are provided in pairs to increase the electromagnetic driving force which causes the moving element 2 to reciprocate through energization.

In addition, although an outer rotor type linear actuator has been exemplified in the present embodiment, the present invention is applicable also to an inner rotor type linear actuator in which the moving element 2 is disposed in the radial direction inside of the stator 1.

Various other changes may be made without departing from the spirit and scope of the present invention.

INDUSTRIAL APPLICABILITY

According to the present invention described in detail above, the offset position which is the balanced point of the gravity acting on the moving element and the offset force by the permanent magnets may be adjusted to a desired position by only forming the space portion in a state in which a facing portion of the stator core has a cut-out. Therefore, it is possible to properly adjust the offset position without any increase in manufacturing cost or device size compared with a case in which a plurality of kinds of permanent magnets are used or other mechanisms are introduced. Further, since it is only a process of forming the space portion in a state in which the facing portion of the stator core has a cut-out, it is possible to pursue reduction in manufacturing cost without the need of adding additional components or largely changing manufacturing steps. Accordingly, it is possible to provide a movable iron core linear actuator suitable for reducing the cost and the device size.

The invention claimed is:

1. A movable iron core linear actuator of which moving element is made to reciprocate, the linear actuator comprising a magnetic circuit which includes:
   an iron core which constitutes the moving element;
   a stator core which includes a facing portion which faces the iron core;
   a pair of permanent magnets disposed in a facing portion along the reciprocating direction, the pair of permanent magnets having inverted magnetic poles at their surfaces which face the iron core; and
   a coil wound around the stator core,
   the magnetic circuit causing, via the magnetic flux produced by energization of the coil, the moving element to reciprocate by weakening the magnetic flux produced in the magnet situated in a necessary direction between the pair of permanent magnets, and strengthening the magnetic flux produced in the other magnet, and the magnetic circuit causing the offset force to act on the moving element by the magnetic flux produced by the permanent magnet in a state in which the coil is not energized,
   wherein since a space portion having low magnetic permeability compared with the stator core is provided in a state in which a part of the facing portion is removed in an area, which is a magnetic flux path, between a part of the facing portion of the stator core and the permanent magnet, an offset position which is a balanced point of the gravity acting on the moving element and the offset force by the permanent magnets is changed compared with a case in which no space portion is provided.

2. The movable iron core linear actuator according to claim 1, wherein the space portion is formed with the offset position being at the center of the movable range of the moving element.

3. The movable iron core linear actuator according to claim 2, wherein the space portion is formed only in a facing portion which faces a permanent magnet on the side of the gravity direction between the pair of permanent magnets.

4. The movable iron core linear actuator according to claim 3, wherein the permanent magnet in which the space portion is formed between the permanent magnet and the facing portion of the stator core is supported by a pillar portion which is formed at the facing portion outside the movable range of the moving element.

5. The movable iron core linear actuator according to claim 4, wherein the permanent magnets are provided in a plurality of pairs and the space portion is formed between one of the permanent magnets of each of the pairs and the facing portion which faces that permanent magnet.

6. The movable iron core linear actuator according to claim 3, wherein the permanent magnets are provided in a plurality of pairs and the space portion is formed between one of the permanent magnets of each of the pairs and the facing portion which faces that permanent magnet.

7. The movable iron core linear actuator according to claim 2, wherein the permanent magnet in which the space portion is formed between the permanent magnet and the facing portion of the stator core is supported by a pillar portion which is formed at the facing portion outside the movable range of the moving element.

8. The movable iron core linear actuator according to claim 7, wherein the permanent magnets are provided in a plurality of pairs and the space portion is formed between one of the permanent magnets of each of the pairs and the facing portion which faces that permanent magnet.

9. The movable iron core linear actuator according to claim 2, wherein the permanent magnets are provided in a plurality of pairs and the space portion is formed between one of the permanent magnets of each of the pairs and the facing portion which faces that permanent magnet.

10. The movable iron core linear actuator according to claim 1, wherein the space portion is formed only in a facing portion which faces a permanent magnet on the side of the gravity direction between the pair of permanent magnets.

11. The movable iron core linear actuator according to claim 10, wherein the permanent magnet in which the space portion is formed between the permanent magnet and the facing portion of the stator core is supported by a pillar portion which is formed at the facing portion outside the movable range of the moving element.

12. The movable iron core linear actuator according to claim 11, wherein the permanent magnets are provided in a plurality of pairs and the space portion is formed between one of the permanent magnets of each of the pairs and the facing portion which faces that permanent magnet.

13. The movable iron core linear actuator according to claim 10, wherein the permanent magnets are provided in a plurality of pairs and the space portion is formed between one of the permanent magnets of each of the pairs and the facing portion which faces that permanent magnet.

14. The movable iron core linear actuator according to claim 1, wherein the permanent magnet in which the space portion is formed between the permanent magnet and the facing portion of the stator core is supported by a pillar portion which is formed at the facing portion outside the movable range of the moving element.

15. The movable iron core linear actuator according to claim 14, wherein the permanent magnets are provided in a plurality of pairs and the space portion is formed between one of the permanent magnets of each of the pairs and the facing portion which faces that permanent magnet.

16. The movable iron core linear actuator according to claim 1, wherein the permanent magnets are provided in a plurality of pairs and the space portion is formed between one of the permanent magnets of each of the pairs and the facing portion which faces that permanent magnet.

* * * * *